(12) United States Patent
Endo et al.

(10) Patent No.: US 8,928,200 B2
(45) Date of Patent: Jan. 6, 2015

(54) ROTATING ELECTRIC MACHINE

(75) Inventors: Yasuhiro Endo, Toyota (JP); Koji Nakamura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 134 days.

(21) Appl. No.: 13/579,488

(22) PCT Filed: Feb. 17, 2010

(86) PCT No.: PCT/JP2010/052340
§ 371 (c)(1),
(2), (4) Date: Aug. 16, 2012

(87) PCT Pub. No.: WO2011/101960
PCT Pub. Date: Aug. 25, 2011

(65) Prior Publication Data
US 2012/0306312 A1    Dec. 6, 2012

(51) Int. Cl.
*H02K 5/12* (2006.01)
*H02K 1/18* (2006.01)

(52) U.S. Cl.
CPC ..................................... *H02K 1/185* (2013.01)
USPC .................................. 310/216.113; 310/405

(58) Field of Classification Search
USPC ............... 310/216.113, 216.119, 54, 57, 405, 310/406, 89
See application file for complete search history.

(56) References Cited

U.S. PATENT DOCUMENTS

| | | | |
|---|---|---|---|
| 4,517,479 A * | 5/1985 | Aleem et al. ..................... | 310/54 |
| 5,923,108 A * | 7/1999 | Matake et al. ................... | 310/89 |
| 6,028,386 A * | 2/2000 | Kech et al. ..................... | 310/194 |
| 7,737,585 B2 * | 6/2010 | Bahr et al. ...................... | 310/54 |
| 2007/0210655 A1 * | 9/2007 | Bahr et al. ...................... | 310/54 |
| 2009/0206688 A1 | 8/2009 | Sano et al. | |
| 2012/0017425 A1 | 1/2012 | Endo et al. | |

FOREIGN PATENT DOCUMENTS

| | | |
|---|---|---|
| JP | 2005-312151 A | 11/2005 |
| JP | 2009-060760 A | 3/2009 |
| JP | 2009-142031 A | 6/2009 |
| JP | 2009-195082 A | 8/2009 |
| JP | 2010-022171 A | 1/2010 |
| WO | 2010/119519 A1 | 10/2010 |

OTHER PUBLICATIONS

International Search Report of PCT/JP2010/052340 dated Apr. 13, 2010.

* cited by examiner

*Primary Examiner* — Dang Le
(74) *Attorney, Agent, or Firm* — Sughrue Mion, PLLC

(57) ABSTRACT

An external cylindrical ring for use in this rotating electric machine includes a body portion and a flange, the body portion including a fastening region making internal contact with an outer circumferential surface of a stator core to be fastened to the outer circumferential surface of the stator core, and a skirt region located at a bottom surface side of a casing and having an inner diameter larger than an inner diameter of the fastening region. When the external cylindrical ring is fastened to the stator core, the deformation of the skirt region of the external cylindrical ring can be suppressed, thus enabling the dimensional accuracy of an outer surface of a cylindrical skirt region of the external cylindrical ring to fall within tolerance.

7 Claims, 12 Drawing Sheets

ROTATING ELECTRIC MACHINE

CROSS REFERENCE TO RELATED APPLICATIONS

This application is a National Stage of International Application No. PCT/JP2010/052340 filed Feb. 17, 2010, the contents of all of which are incorporated herein by reference in their entirety.

TECHNICAL FIELD

The present invention relates to the structure of a rotating electric machine.

BACKGROUND ART

A motor or a generator as a rotating electric machine mounted on a vehicle such as cars includes a rotor, and a stator in an annular shape arranged annularly around the rotor. With the motor, torque is obtained when a current passes through the stator, while with the generator, a current is obtained when the rotor rotates.

A stator includes an annular stator core having stator winding. The stator core has a plurality of annularly arranged divided cores, with an external cylindrical ring being fastened to an outer circumferential surface of the stator core.

When fixing the stator to a motor case, alignment and centering between the stator and the motor case is usually performed with an alignment mechanism using a pin or the like provided on the external cylindrical ring. When fastening the external cylindrical ring to the annularly arranged divided cores, however, the external cylindrical ring is heated and cooled by shrink fit and molding resin sealing, which may result in radial misalignment of the alignment mechanism using a pin or the like.

For example, even if the alignment mechanism using a pin or the like is provided between the external cylindrical ring and the motor case with reference to an inner diameter of the external cylindrical ring, the external cylindrical ring will be deformed due to heating and cooling if shrink fit is employed.

FIG. 20 is a perspective view of an external cylindrical ring 120. External cylindrical ring 120 has a cylindrical shape with open opposite ends, with a flange 122 extending radially outward being provided along the entire circumference of one of the ends. Flange 122 includes wide regions 123 each having a bolt hole 123h for use when fixing external cylindrical ring 120 to a motor case, and an alignment hole 123p into which an alignment pin fits if the alignment pin is provided on the motor case as an alignment mechanism. Alternatively, the alignment holes may be provided in the motor case and the alignment pins may be provided on the external cylindrical ring as an alignment mechanism.

FIG. 21 is a schematic cross-sectional view showing a state where divided cores 110 have been fixed using external cylindrical ring 120 by shrink fit. If external cylindrical ring 120 is not deformed, external cylindrical ring 120 is completed with an inner diameter ($\phi$D1) as was designed, and the alignment mechanism (not shown) using alignment holes 123p and the like provided on flange 122 of external cylindrical ring 120 is also completed with designed dimensions.

As shown in FIG. 22, however, when shrink fit is employed, external cylindrical ring 120 contracts when cooled, causing a high internal pressure (direction of an arrow F in the figure) to be applied from a stator core 111 to an inner surface of external cylindrical ring 120. External cylindrical ring 120 is thus deformed. The amount of deformation is greater on the side of external cylindrical ring 120 where flange 122 is not provided, due to its lower rigidity.

Accordingly, external cylindrical ring 120 is deformed, resulting in misalignment of alignment holes 123p provided in flange 122. It is noted that FIG. 22 exaggerates the actual amount of deformation to facilitate understanding of the deformation of external cylindrical ring 120.

An alignment mechanism may be provided after an external cylindrical ring is fastened to a stator core. This requires additional work and additional members, however, causing an increase in manufacturing cost of a rotating electric machine. A stator having a structure in which annularly arranged divided cores are fastened using an external cylindrical ring is disclosed in the following patent literature.

CITATION LIST

Patent Literature

PTL 1: Japanese Patent Laying-Open No. 2005-312151

SUMMARY OF INVENTION

Technical Problem

A problem to be solved by the present invention is that, when an external cylindrical ring is fastened to a stator core during the manufacture of a stator for use in a rotating electric machine, radial misalignment occurs in an alignment mechanism provided on the stator. The present invention was made to solve this problem, and an object of the present invention is to provide a rotating electric machine having a structure capable of suppressing the deformation of an external cylindrical ring when the external cylindrical ring is fastened to a stator core.

Solution To Problem

A rotating electric machine based on the present invention includes a stator in an annular shape and a casing for fixing the stator, and has a structure described below.

The stator includes a stator core, and an external cylindrical ring fastened to an outer circumferential surface of the stator core, and the external cylindrical ring includes a cylindrical body portion, and a flange extending radially outward and being provided on one end portion of the body portion located at an entry side of the casing.

The body portion includes a fastening region making internal contact with the outer circumferential surface of the stator core and fastened to the outer circumferential surface of the stator core, and a skirt region located at a bottom surface side of the casing and provided with an inner diameter different from an inner diameter of the fastening region, and the skirt region includes a region contacting an inner surface of the casing.

In another embodiment of the invention, the skirt region includes a region in which a tip portion at the bottom surface side of the casing is positioned on an outer side relative to the position of the inner diameter of the fastening region.

In another embodiment, the skirt region includes a region provided parallel to the fastening region.

In another embodiment, the skirt region includes a region in which the tip portion at the bottom surface side of the casing is positioned on an inner side relative to the position of the inner diameter of the fastening region, and the inner surface of the casing includes a projecting region contacting the skirt region.

In another embodiment, the skirt region includes a region provided parallel to the fastening region.

In another embodiment, the skirt region has a tapered shape with a diameter gradually decreasing inward.

In any one of the other embodiments of the invention, the skirt region includes a region not contacting the casing, and a weak area is provided in this region.

Advantageous Effects Of Invention

According to the rotating electric machine based on the present invention, a rotating electric machine having a structure capable of suppressing the deformation of an external cylindrical ring when the external cylindrical ring is fastened to a stator core can be provided.

DESCRIPTION OF EMBODIMENTS

Rotating electric machines in embodiments based on the present invention will be described with reference to the drawings. If any reference to a number, an amount and the like is made in the embodiments described below, the scope of the present invention is not necessarily limited to that number, amount and the like unless otherwise specified.

In the description, the same or corresponding components are designated by the same reference numbers, and redundant description may not be repeated. Furthermore, unless otherwise specified, it is originally intended to appropriately combine structures described in the following embodiments for use.

First Embodiment

Figure 1:
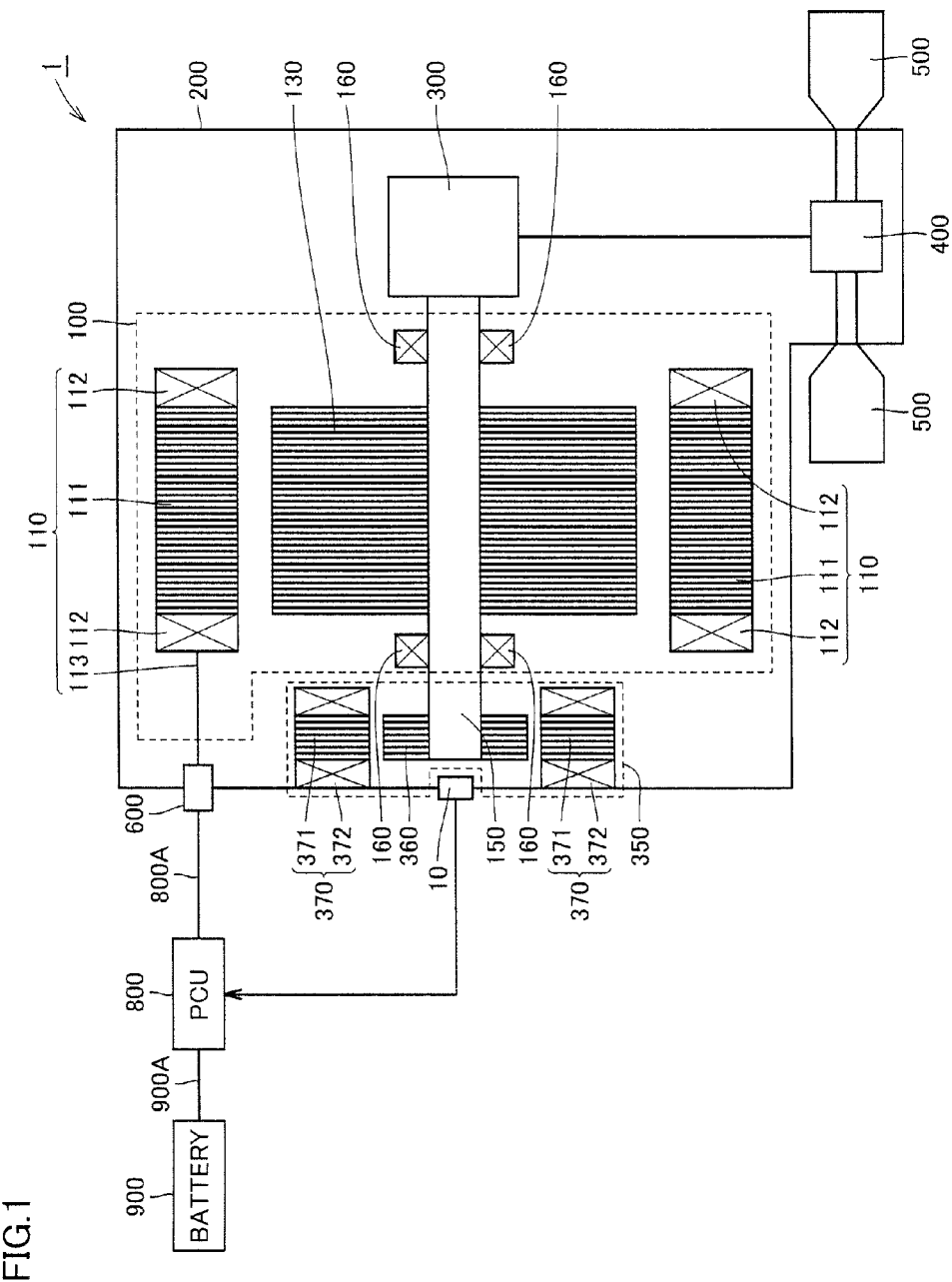
FIG. 1 schematically shows an example of the structure of a drive unit having a rotating electric machine in a first embodiment.

FIG. 1 schematically shows an example of the structure of a drive unit 1 having a rotating electric machine in one embodiment of the present invention. In the example shown in FIG. 1, drive unit 1 is mounted on a hybrid vehicle, and includes a motor generator 100, a casing 200, a resolver 350, a reduction gear 300, a differential gear 400, a drive shaft receiving unit 500, and a terminal block 600.

Motor generator 100 is a rotating electric machine having the function of a motor or a generator, and includes a rotation shaft 150 rotatably mounted in casing 200 via bearings 160, a rotor 130 mounted on rotation shaft 150, and a stator 110.

Rotor 130 includes a rotor core formed of plate-like magnetic bodies such as iron or iron alloy stacked on one another, and permanent magnets embedded in the rotor core. The permanent magnets are arranged at substantially regular intervals in the vicinity of an outer circumference of the rotor core.

Stator 110 includes a ring-shaped stator core 111, a stator coil 112 wound around stator core 111, and a bus bar 113 connected to stator coil 112. Bus bar 113 is connected to a PCU (Power Control Unit) 800 via terminal block 600 provided in casing 200 and a power feed cable 800A. PCU 800 is connected to a battery 900 via a power feed cable 900A. Battery 900 is thus electrically connected to stator coil 112.

Stator core 111 has a plurality of annularly arranged divided cores, each divided core being formed of plate-like magnetic bodies such as iron or iron alloy stacked on one another. An inner circumferential surface of stator core 111 is provided with a plurality of teeth (not shown), and slots (not shown) as recesses formed between the teeth. The slots are provided to open to the inner circumference of stator core 111. On an outer circumferential surface of stator core 111, an external cylindrical ring (see FIG. 2) for fastening the divided cores is provided.

Stator coil 112 including a U-phase, a V-phase and a W-phase as three winding phases is wound around the teeth to fit into the slots. The U-phase, V-phase and W-phase of stator coil 112 are wound to be circumferentially out of phase from one another. Bus bar 113 includes a U-phase, a V-phase and a W-phase corresponding to the U-phase, V-phase and W-phase of stator coil 112, respectively.

Power feed cable 800A is a three-phase cable including a U-phase cable, a V-phase cable and a W-phase cable. The U-phase, V-phase and W-phase of bus bar 113 are connected to the U-phase cable, V-phase cable and W-phase cable of power feed cable 800A, respectively.

Motive power output from motor generator 100 is transmitted from reduction gear 300 to drive shaft receiving unit 500 via differential gear 400. A driving force transmitted to drive shaft receiving unit 500 is transmitted as torque to wheels (not shown) via a drive shaft (not shown), to run the vehicle.

During regenerative braking of the hybrid vehicle, on the other hand, the wheels are rotated by an inertial force of a vehicle body. Motor generator 100 is driven by torque from the wheels via drive shaft receiving unit 500, differential gear 400 and reduction gear 300. Here, motor generator 100 acts as a generator. Electric power generated by motor generator 100 is stored in battery 900 via an inverter in PCU 800.

Resolver 350 includes a resolver rotor 360 and a resolver stator 370. Resolver rotor 360 is connected to rotation shaft 150 of motor generator 100. Resolver stator 370 includes a resolver stator core 371, and a resolver stator coil 372 wound around this core.

Resolver 350 detects an angle of rotation of rotor 130 of motor generator 100. The detected angle of rotation is transmitted to PCU 800 via a connector 10. PCU 800 generates a drive signal for driving motor generator 100 by using the detected angle of rotation of rotor 130 and a torque command value from an external ECU (Electrical Control Unit), and outputs the generated drive signal to motor generator 100.

External Cylindrical Ring 120A

Figure 2:
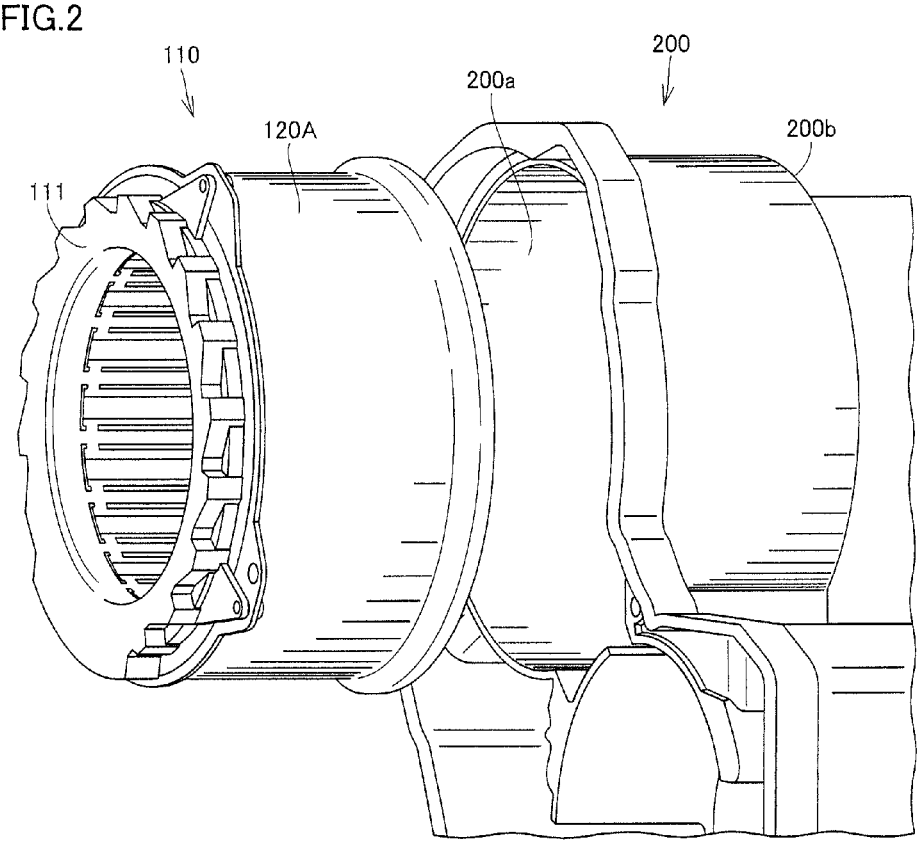
FIG. 2 is a schematic perspective view showing the structures of a stator and a casing of the rotating electric machine in the first embodiment.
Figure 3:
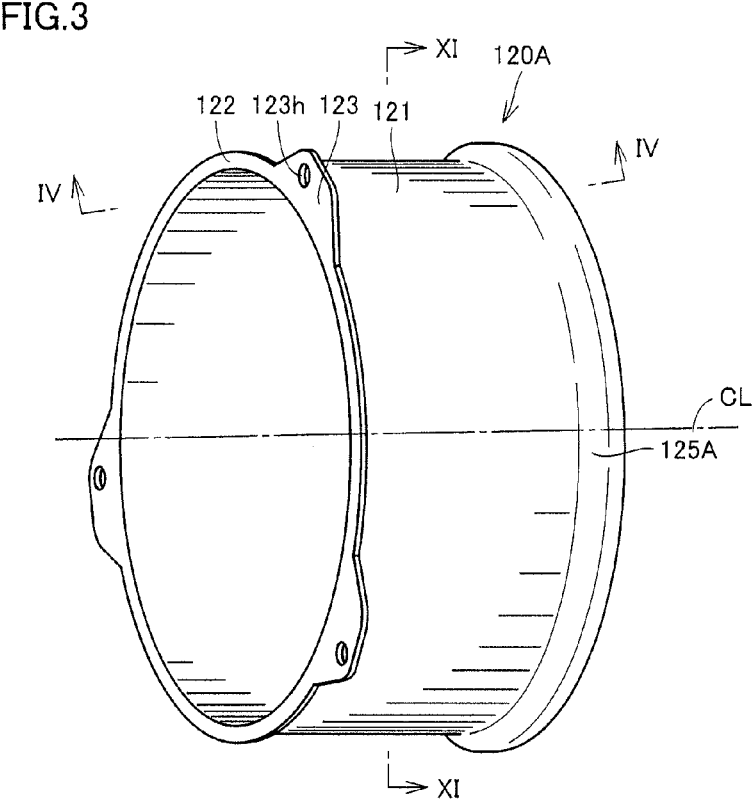
FIG. 3 is a perspective view showing the structure of an external cylindrical ring in the first embodiment.
Figure 4:
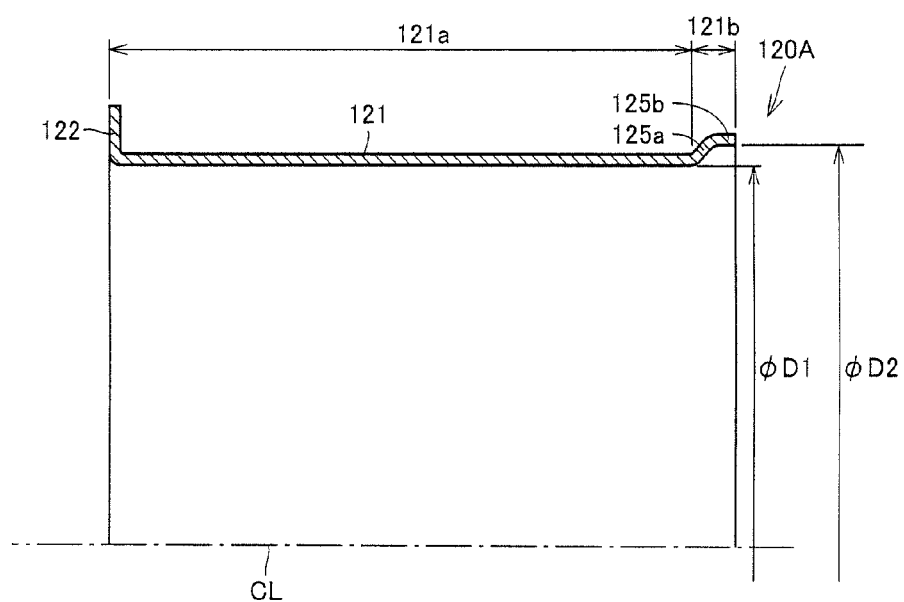
FIG. 4 is a cross-sectional view taken along line IV-IV in a direction of arrows in FIG. 3.
Figure 5:
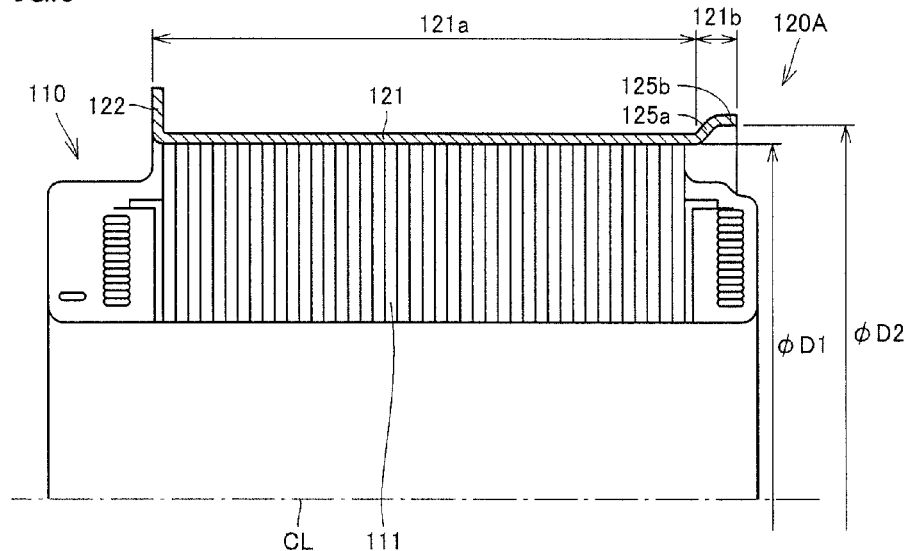
FIG. 5 is a partial cross-sectional view showing a state where the external cylindrical ring has been fastened to an outer circumferential surface of a stator core in the first embodiment.
Figure 6:
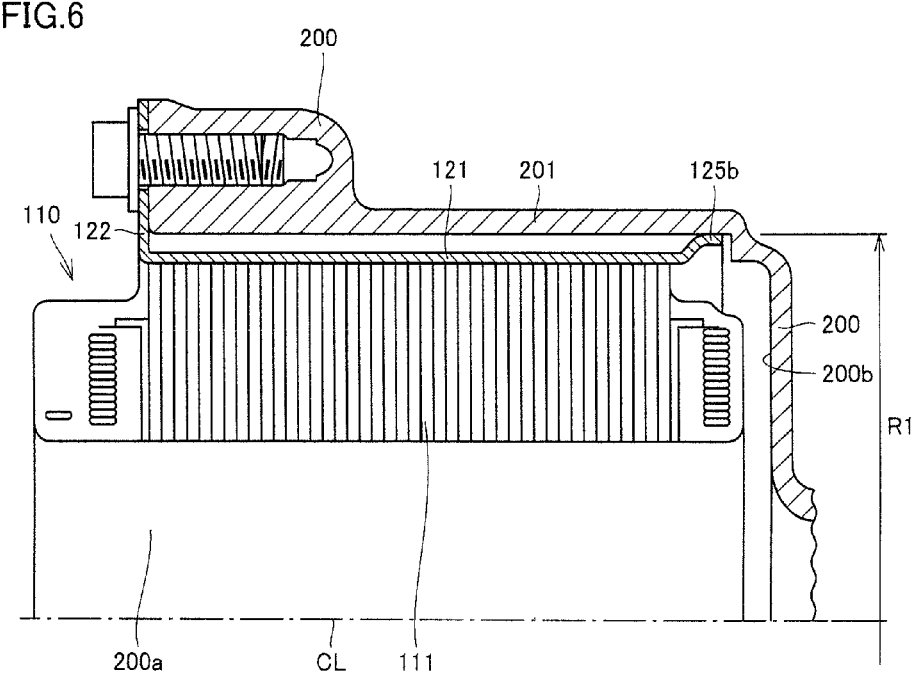
FIG. 6 is a partial cross-sectional view showing a state where the stator has been fixed within the casing in the first embodiment.

Referring now to FIGS. 2 to 6, the structure of an external cylindrical ring 120A in this embodiment will be described. FIG. 2 is a schematic perspective view showing the structures of stator 110 and casing 200, FIG. 3 is a perspective view showing the structure of external cylindrical ring 120A, FIG. 4 is a cross-sectional view taken along line IV-IV in a direction of arrows in FIG. 3, FIG. 5 is a partial cross-sectional view showing a state where external cylindrical ring 120A has been fastened to the outer circumferential surface of stator core 111, and FIG. 6 is a partial cross-sectional view showing a state where stator 110 has been fixed within casing 200.

Referring to FIG. 2, stator 110 is inserted into casing 200 from an entry side 200a of casing 200, to be aligned and fixed accurately with respect to casing 200. The rotor mounted on the inner side of stator 110 is not illustrated in FIG. 2. Stator 110 includes stator core 111, and external cylindrical ring 120A to be fastened to the outer circumferential surface of stator core 111.

Referring to FIG. 3, external cylindrical ring 120A includes a cylindrical body portion 121, and a flange 122 extending radially outward and being provided on one end portion of body portion 121 located at entry side 200a of casing 200. Flange 122 includes wide regions 123 each having a bolt hole 123h for use when fixing external cylindrical ring 120A to casing 200, with a pitch of 120 degrees around a rotation central axis CL.

Referring to FIG. 4, body portion 121 includes a fastening region 121a making internal contact with the outer circumferential surface of stator core 111 to be fastened to the outer circumferential surface of stator core 111, and a skirt region 121b located at a bottom surface side 200b (opposite to the side where flange 122 is provided) of casing 200 and provided with an inner diameter ($\phi$D2) different from an inner diameter ($\phi$D1) of fastening region 121a.

In this embodiment, at least a tip portion of skirt region 121b is positioned on an outer side relative to the position of the inner diameter of fastening region 121a. Skirt region 121b includes a tapered skirt region 125a gradually extending radially outward, and a cylindrical skirt region 125b provided parallel to fastening region 121a. The inner diameter ($\phi$D2) of cylindrical skirt region 125b is set to be larger than the inner diameter ($\phi$D1) of fastening region 121a.

Referring to FIG. 5, when stator core 111 is fastened using external cylindrical ring 120A having the structure described above, the deformation of external cylindrical ring 120A when fastened to stator core 111 can be suppressed. This is because skirt region 121b is a member of external cylindrical ring 120A with a diameter increasing outward, thereby achieving increased rigidity of skirt region 121b as with flange 122.

During shrink fit, external cylindrical ring 120A contracts when cooled, causing a high internal pressure to be applied from stator core 111 to an inner surface of external cylindrical ring 120A. Yet the deformation of skirt region 121b can be suppressed owing to the increased rigidity of skirt region 121b.

Consequently, as shown in FIG. 6, cylindrical skirt region 125b of external cylindrical ring 120A has a highly accurate outer diameter dimension ($\Phi$R1) after the fastening, thus enabling an outer surface of cylindrical skirt region 125b to abut an inner surface of a cylindrical portion 201 of casing 200. As a result, stator 110 can be aligned accurately with respect to casing 200.

Function/Effect

As described above, according to this embodiment, when external cylindrical ring 120A is fastened to stator core 111, the deformation of skirt region 121b of external cylindrical ring 120A can be suppressed. As a result, after external cylindrical ring 120A has been fastened to stator core 111 by shrink fit, the dimensional accuracy of the outer surface of cylindrical skirt region 125b of external cylindrical ring 120A can fall within tolerance.

Accordingly, alignment between stator 110 and casing 200 can be performed using cylindrical skirt region 125b, eliminating the need to adopt a conventional alignment mechanism using a pin or the like. Therefore, a rotating electric machine having high operational reliability can be provided without increasing manufacturing cost of the rotating electric machine.

Second Embodiment

Figure 7:
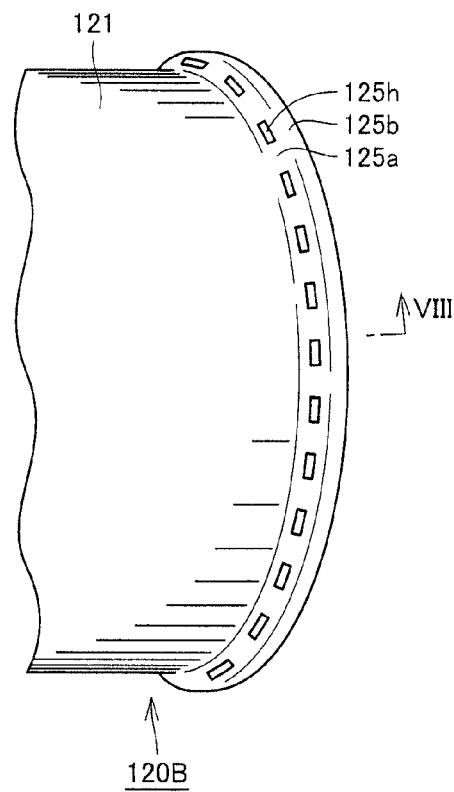
FIG. 7 is a partial perspective view showing the structure of an external cylindrical ring in a second embodiment.
Figure 8:
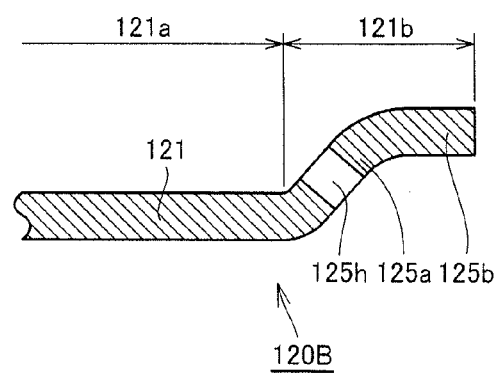
FIG. 8 is a cross-sectional view taken along line VIII in a direction of an arrow in FIG. 7.
Figure 9:
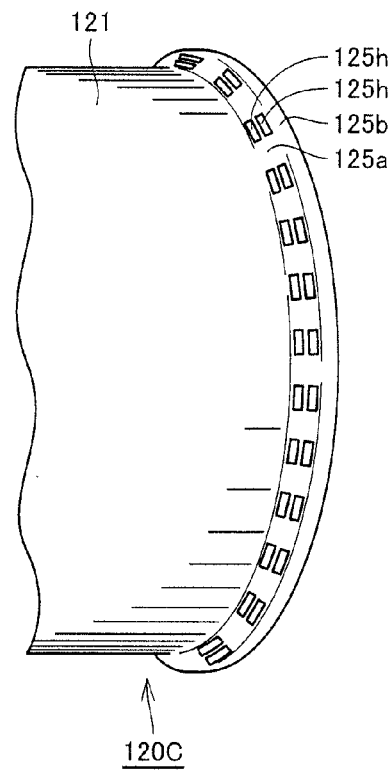
FIG. 9 is a partial perspective view showing another embodiment of the external cylindrical ring in the second embodiment.
Figure 10:
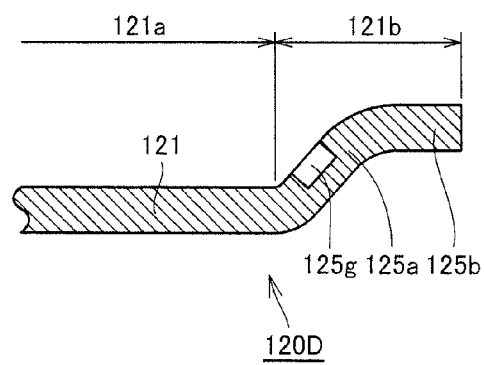
FIG. 10 is a partial cross-sectional view showing yet another embodiment of the external cylindrical ring in the second embodiment.

Referring now to FIGS. 7 to 10, other embodiments of the external cylindrical ring will be described. The structures of motor generator 100 and stator core 111 are the same as those in the first embodiment, and thus description thereof will not be repeated. FIG. 7 is a partial perspective view showing the structure of an external cylindrical ring 120B, FIG. 8 is a cross-sectional view taken along line VIII in a direction of an arrow in FIG. 7, FIG. 9 is a partial perspective view showing the structure of an external cylindrical ring 120C of another embodiment, and FIG. 10 is a partial cross-sectional view showing the structure of an external cylindrical ring 120D of yet another embodiment.

External cylindrical ring 120B in a second embodiment includes fastening region 121a and skirt region 121b identical in outer shape to those of external cylindrical ring 120A in the first embodiment, and further includes a plurality of openings 125h provided in tapered skirt region 125a of skirt region 121b.

By providing the plurality of openings 125h as weak areas in tapered skirt region 125a, tapered skirt region 125a will be readily deformed. By providing openings 125h, stress generated when fastening external cylindrical ring 120B to stator core 111 can be actively absorbed in the weak areas, thereby further enabling the dimensional accuracy of the outer surface of cylindrical skirt region 125b to fall within tolerance.

While the single plurality of openings 125h are provided annularly in tapered skirt region 125a in external cylindrical ring 120B shown in FIG. 8, a double plurality of openings 125h can be provided annularly as shown in external cylindrical ring 120C of FIG. 9, or a triple plurality of openings 125h can be provided, for example. Alternatively, openings 125h can be alternately shifted.

Furthermore, instead of providing openings 125h as in external cylindrical ring 120B and external cylindrical ring 120C, a groove 125g may be provided as a thin portion in tapered skirt region 125a as in external cylindrical ring 120D shown in FIG. 10. Groove 125g may be in a continuous annular shape, or may be divided into a plurality of grooves as with openings 125h.

Function/Effect

As described above, according to this embodiment, the same function and effect as those of external cylindrical ring 120A in the first embodiment can be obtained. Moreover, by actively providing the weak areas in tapered skirt region 125a, stress generated when fastening external cylindrical ring 120B to stator core 111 can be actively absorbed in the weak areas, thereby further enabling the dimensional accuracy of the outer surface of cylindrical skirt region 125b to fall within tolerance.

Third Embodiment

Figure 11:
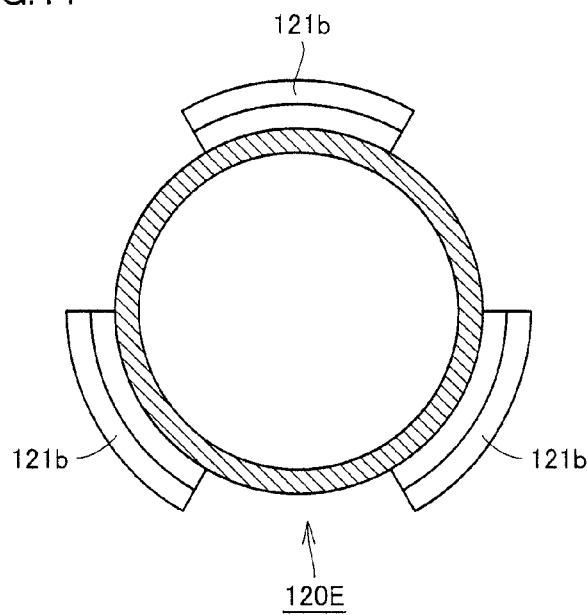
FIG. 11 shows the structure of an external cylindrical ring in a third embodiment, taken along line XI-XI in a direction of arrows in FIG. 3.

Referring now to FIG. 11, another embodiment of the external cylindrical ring will be described. The structures of motor generator 100 and stator core 111 are the same as those in the first embodiment, and thus description thereof will not be repeated. FIG. 11 shows the structure of an external cylindrical ring 120E, taken along line XI-XI in a direction of arrows in FIG. 3.

External cylindrical ring 120E in a third embodiment includes fastening region 121a identical in outer shape to that of external cylindrical ring 120A in the first embodiment, and skirt region 121b divided into three sections instead of being in a continuous annular shape. In this embodiment, the width of and space between skirt regions 121b is set with a pitch of 60 degrees circumferentially.

Function/Effect

As described above, according to this embodiment, the same function and effect as those of external cylindrical ring 120A in the first embodiment can be obtained. The size of a rotating electric machine varies with the required capacity. Thus, the shape of an external cylindrical ring and the thicknesses of members are selected out of a variety of optimal materials. By dividing skirt region 121b into a plurality of sections, therefore, the rigidity of skirt regions 121b can be adjusted. As was described in the second embodiment, weak areas can be actively provided in the tapered skirt regions in this embodiment as well.

Fourth Embodiment

Figure 12:
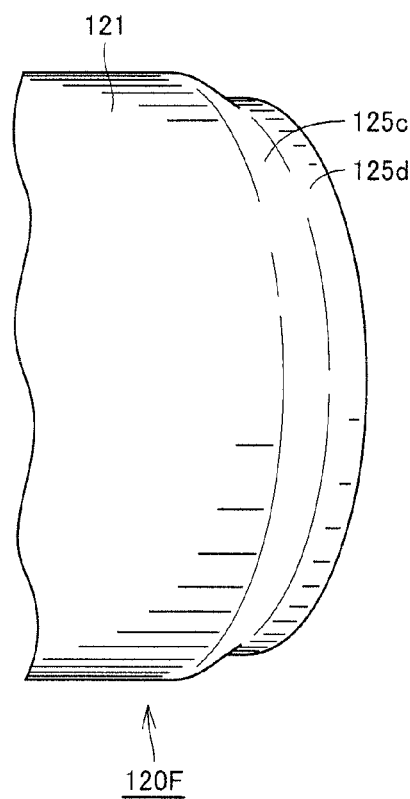
FIG. 12 is a partial perspective view showing the structure of an external cylindrical ring in a fourth embodiment.
Figure 13:
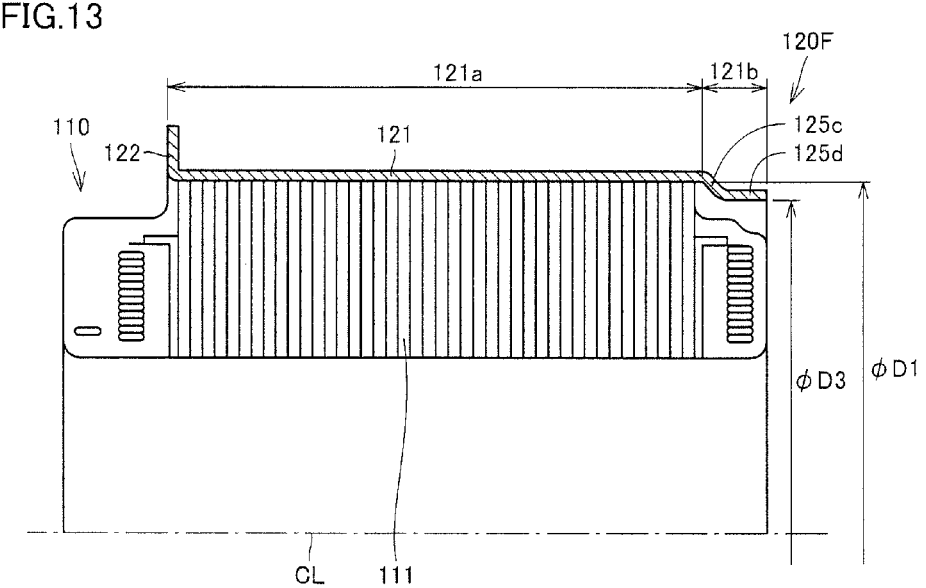
FIG. 13 is a partial cross-sectional view showing a state where the external cylindrical ring has been fastened to an outer circumferential surface of a stator core in the fourth embodiment.
Figure 14:
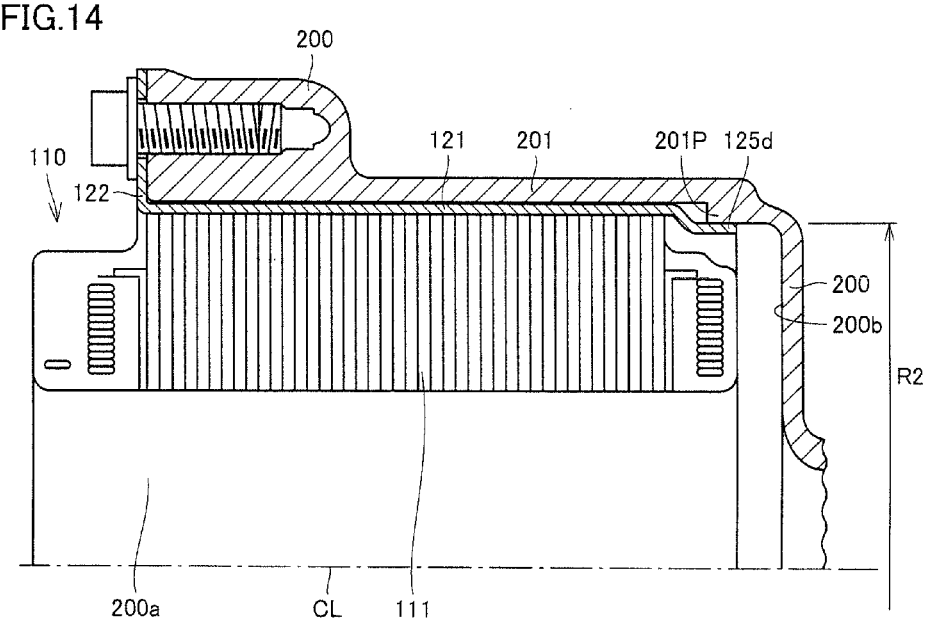
FIG. 14 is a partial cross-sectional view showing a state where a stator has been fixed within a casing in the fourth embodiment.
Figure 15:
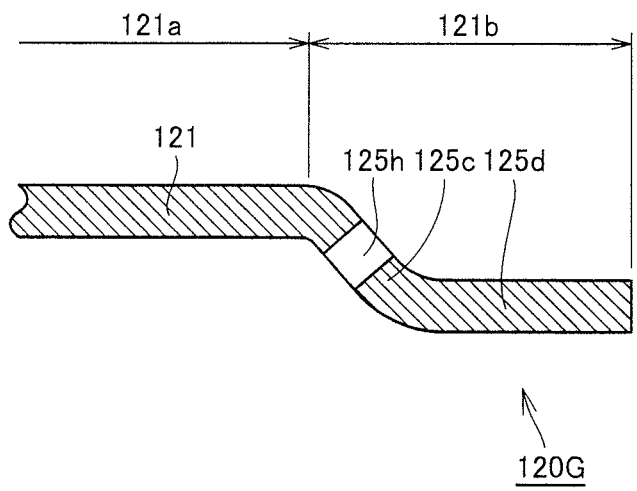
FIG. 15 is a partial cross-sectional view showing another embodiment of the external cylindrical ring in the fourth embodiment.
Figure 16:
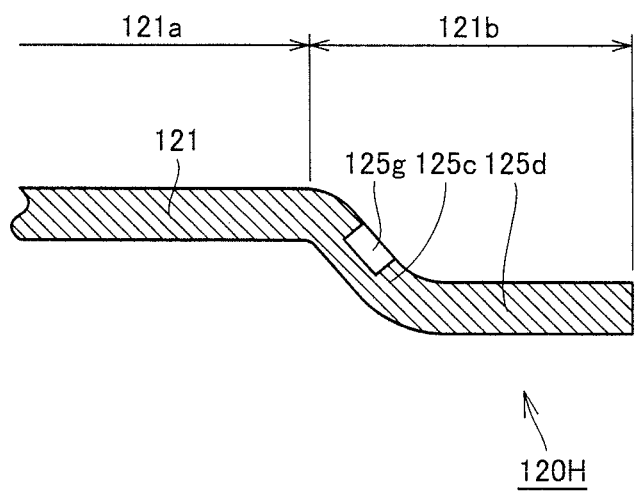
FIG. 16 is a partial cross-sectional view showing yet another embodiment of the external cylindrical ring in the fourth embodiment.

Referring now to FIGS. 12 to 16, another embodiment of the external cylindrical ring will be described. The structures of motor generator 100 and stator core 111 are the same as those in the first embodiment, and thus description thereof will not be repeated. FIG. 12 is a partial perspective view showing the structure of an external cylindrical ring 120F, FIG. 13 is a partial cross-sectional view showing a state where external cylindrical ring 120F has been fastened to the outer circumferential surface of stator core 111, FIG. 14 is a partial cross-sectional view showing a state where stator 110 has been fixed within casing 200, FIG. 15 is a partial cross-sectional view showing an external cylindrical ring 120G of another embodiment, and FIG. 16 is a partial cross-sectional view showing an external cylindrical ring 120H of yet another embodiment.

Referring to FIG. 12, external cylindrical ring 120F in this embodiment includes cylindrical body portion 121, and flange 122 extending radially outward and being provided on one end portion of body portion 121 located at entry side 200a of casing 200, which are the same as those of external cylindrical ring 120A in the first embodiment. While not illustrated in FIG. 12, flange 122 has the same shape as that of flange 122 in the first embodiment.

Referring to FIG. 13, body portion 121 includes fastening region 121a making internal contact with the outer circumferential surface of stator core 111 to be fastened to the outer circumferential surface of stator core 111, and skirt region 121b located at bottom surface side 200b (opposite to the side where flange 122 is provided) of casing 200 and provided with an inner diameter ($\phi$D3) different from the inner diameter ($\phi$D1) of fastening region 121a.

In this embodiment, at least a tip portion of skirt region 121b is positioned on an inner side relative to the position of the inner diameter of fastening region 121a. Skirt region 121b includes a tapered skirt region 125c with a diameter gradually decreasing radially inward, and a cylindrical skirt region 125d provided parallel to fastening region 121a. An inner diameter ($\phi$D3) of cylindrical skirt region 125d is set to be smaller than the inner diameter ($\phi$D1) of fastening region 121a.

When stator core 111 is fastened using external cylindrical ring 120F having the structure described above, the deformation of external cylindrical ring 120F when fastened to stator core 111 can be suppressed. This is because skirt region 121b is a member of external cylindrical ring 120F with a diameter decreasing inward, thereby achieving increased rigidity of skirt region 121b as with flange 122.

During shrink fit, external cylindrical ring 120F contracts when cooled, causing a high internal pressure to be applied from stator core 111 to an inner surface of external cylindrical ring 120F. Yet the deformation of skirt region 121b can be suppressed owing to the increased rigidity of skirt region 121b.

Consequently, as shown in FIG. 14, cylindrical skirt region 125d of external cylindrical ring 120F has a highly accurate outer diameter dimension ($\phi$D2) after the fastening, thus enabling an outer surface of cylindrical skirt region 125b to abut a projecting region 201P provided on the inner surface of cylindrical portion 201 of casing 200. As a result, stator 110 can be aligned accurately with respect to casing 200. Projection region 201P may be provided annularly on the inner surface of cylindrical portion 201, or may be divided into a plurality of sections.

Function/Effect

As described above, according to this embodiment, when external cylindrical ring 120F is fastened to stator core 111, the deformation of skirt region 121b of external cylindrical ring 120F can be suppressed. As a result, after external cylindrical ring 120F has been fastened to stator core 111 by shrink fit, the dimensional accuracy of the outer surface of cylindrical skirt region 125d of external cylindrical ring 120F can fall within tolerance.

Accordingly, alignment between stator 110 and casing 200 can be performed using cylindrical skirt region 125d, eliminating the need to adopt a conventional alignment mechanism using a pin or the like. Therefore, a rotating electric machine having high operational reliability can be provided without increasing manufacturing cost of the rotating electric machine.

As shown in FIGS. 15 and 16, in external cylindrical ring 120F of this embodiment as well, tapered skirt region 125c may be provided with the plurality of openings 125h as weak areas (external cylindrical ring 120G shown in FIG. 15), or may be provided with groove 125g (external cylindrical ring 120H shown in FIG. 16), as was described in the second embodiment.

Fifth Embodiment

Figure 17:
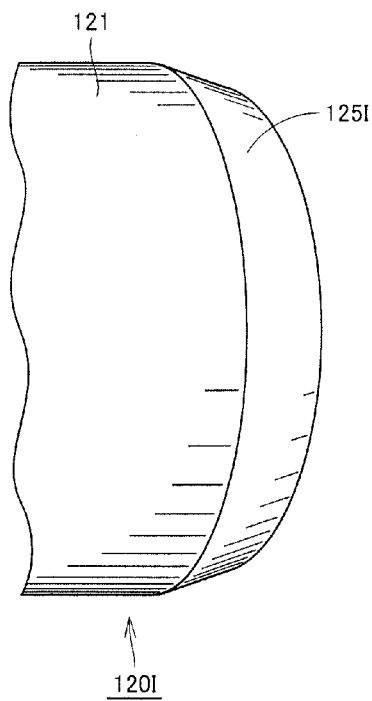
FIG. 17 is a partial perspective view showing the structure of an external cylindrical ring in a fifth embodiment.
Figure 18:
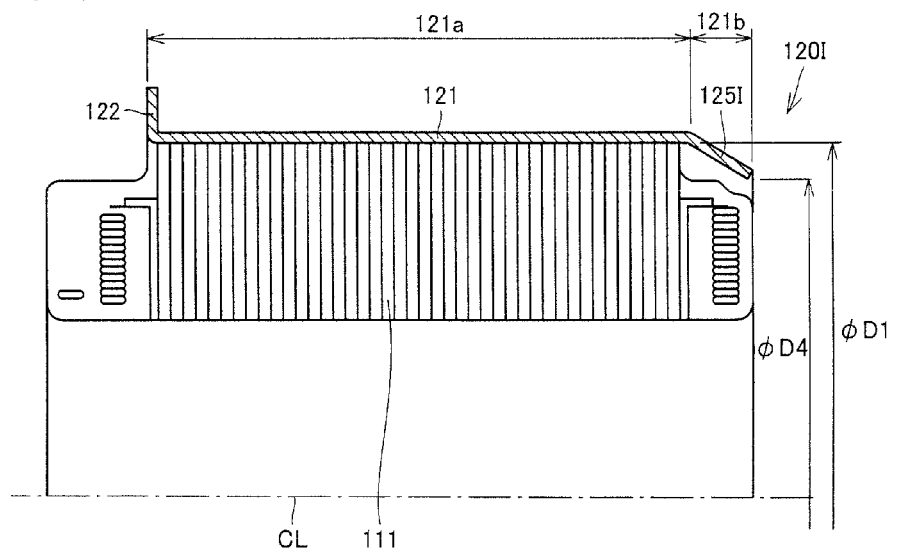
FIG. 18 is a partial cross-sectional view showing a state where the external cylindrical ring has been fastened to an outer circumferential surface of a stator core in the fifth embodiment.
Figure 19:
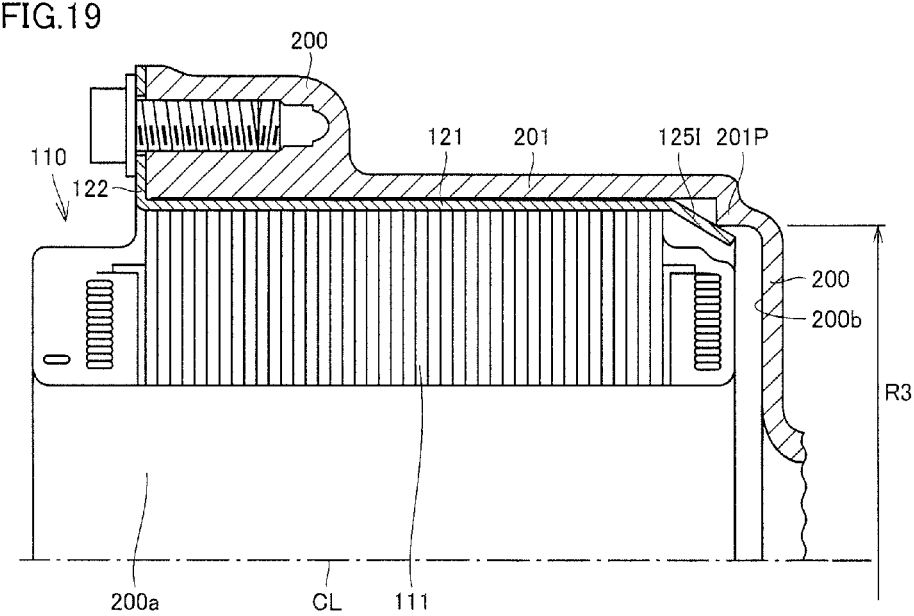
FIG. 19 is a partial cross-sectional view showing a state where a stator has been fixed within a casing in the fifth embodiment.
Figure 20:
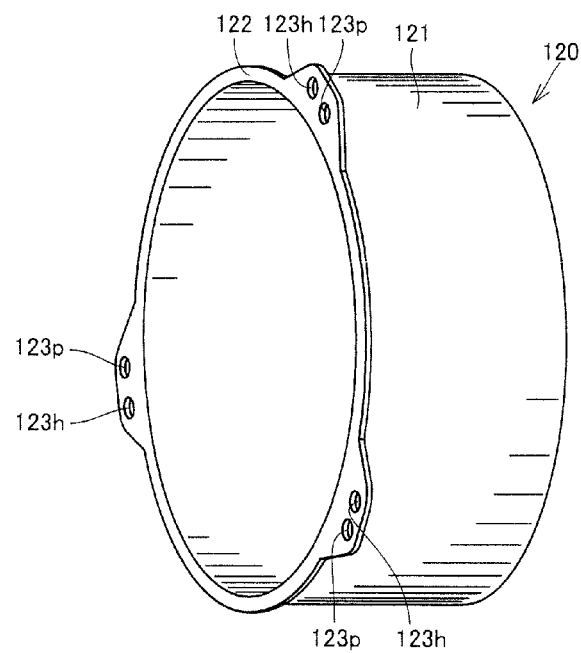
FIG. 20 is a perspective view showing the structure of an external cylindrical ring in the background technique.
Figure 21:
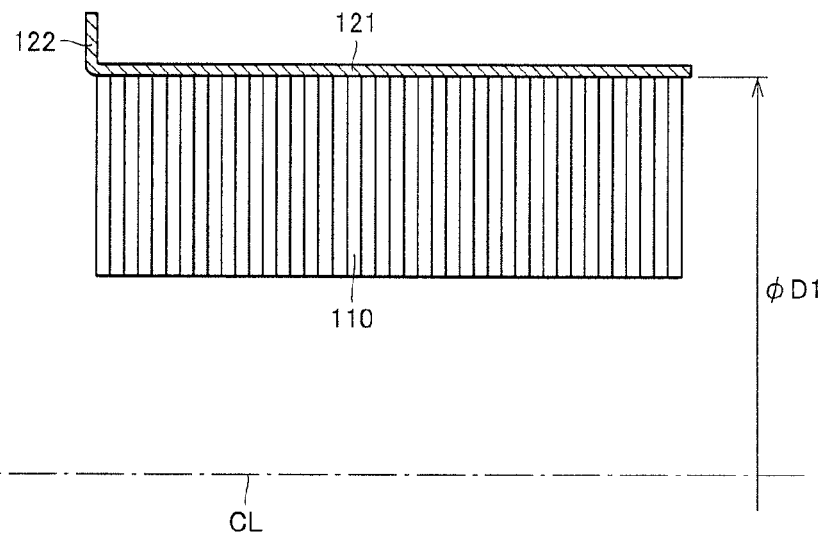
FIG. 21 is a partial cross-sectional view showing a state where the external cylindrical ring has been fastened to an outer circumferential surface of a stator core in the background technique.
Figure 22:
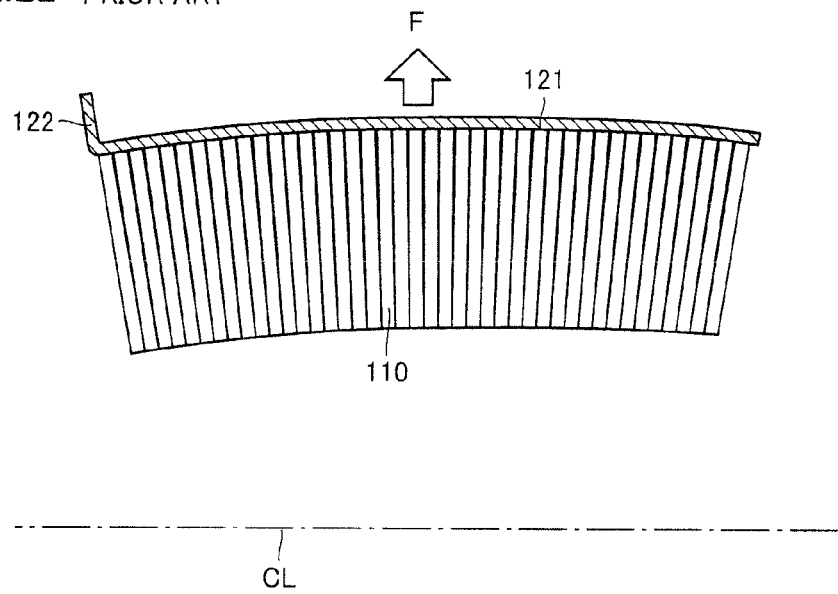
FIG. 22 is a view for explaining a problem in the background technique.

Referring now to FIGS. 17 to 19, another embodiment of the external cylindrical ring will be described. The structures of motor generator 100 and stator core 111 are the same as those in the first embodiment, and thus description thereof will not be repeated. FIG. 17 is a partial perspective view showing the structure of an external cylindrical ring 120I, FIG. 18 is a partial cross-sectional view showing a state where external cylindrical ring 120I has been fastened to the outer circumferential surface of stator core 111, and FIG. 19 is a partial cross-sectional view showing a state where stator 110 has been fixed within the casing.

Referring to FIG. 17, external cylindrical ring 120I in this embodiment includes cylindrical body portion 121, and flange 122 extending radially outward and being provided on one end portion of body portion 121 located at entry side 200a of casing 200, which are the same as those of external cylindrical ring 120A in the first embodiment. While not illustrated in FIG. 17, flange 122 has the same shape as that of flange 122 in the first embodiment.

Referring to FIG. 18, body portion 121 includes fastening region 121a making internal contact with the outer circumferential surface of stator core 111 to be fastened to the outer circumferential surface of stator core 111, and skirt region 121b located at bottom surface side 200b (opposite to the side where flange 122 is provided) of casing 200 and provided with an inner diameter different from the inner diameter ($\phi$D1) of fastening region 121a.

In this embodiment, at least a tip portion of skirt region 121b is positioned on an inner side relative to the position of the inner diameter of fastening region 121a. Skirt region 121b includes a tapered skirt region 125I with a diameter gradually decreasing radially inward. A minimum inner diameter ($\phi$D4) of tapered skirt region 125I is set to be smaller than the inner diameter ($\phi$D1) of fastening region 121a.

When stator core 111 is fastened using external cylindrical ring 120I having the structure described above, the deformation of external cylindrical ring 120I when fastened to stator core 111 can be suppressed. This is because skirt region 121b is a member of external cylindrical ring 120I with a diameter decreasing inward, thereby achieving increased rigidity of skirt region 121b as with flange 122.

During shrink fit, external cylindrical ring 120I contracts when cooled, causing a high internal pressure to be applied from stator core 111 to an inner surface of external cylindrical ring 120I. Yet the deformation of skirt region 121b can be suppressed owing to the increased rigidity of skirt region 121b.

Consequently, as shown in FIG. 19, tapered skirt region 125I of external cylindrical ring 120I has a highly accurate outer diameter dimension ($\Phi$R3) after the fastening, thus enabling an outer surface of tapered skirt region 125I to abut projecting region 201P provided on the inner surface of cylindrical portion 201 of casing 200. As a result, stator 110 can be aligned accurately with respect to casing 200. Projection region 201P may be provided annularly on the inner surface of cylindrical portion 201, or may be divided into a plurality of sections.

Furthermore, in external cylindrical ring 120I of this embodiment, the outer surface of tapered skirt region 125I abutting projecting region 201P has a conical shape, thus facilitating the centering of stator 110.

Function/Effect

As described above, according to this embodiment, when external cylindrical ring 120I is fastened to stator core 111, the deformation of skirt region 121b of external cylindrical ring 120I can be suppressed. As a result, after external cylindrical ring 120I has been fastened to stator core 111 by shrink fit, the dimensional accuracy of the outer surface of tapered skirt region 125I of external cylindrical ring 120I can fall within tolerance.

Accordingly, alignment between stator 110 and casing 200 can be performed using tapered skirt region 125I, eliminating the need to adopt a conventional alignment mechanism using a pin or the like. Therefore, a rotating electric machine having high operational reliability can be provided without increasing manufacturing cost of the rotating electric machine Although the embodiments of the present invention have been described, it should be understood that the embodiments disclosed herein are illustrative and non-restrictive in every respect. The scope of the present invention is defined by the terms of the claims, and is intended to include any modifications within the scope and meaning equivalent to the terms of the claims.

REFERENCE SIGNS LIST 1 drive unit; 100 motor generator (rotating electric machine); 110 stator; 111 stator core; 112 stator coil; 113 bus bar; 120A, 120B, 120C, 120D, 120E, 120F, 120G, 120H, 120I external cylindrical ring; 121 body portion; 121a fastening region; 121b skirt region; 122 flange; 123 wide region; 123h bolt hole; 125a, 125c, 125I tapered skirt region; 125b, 125d cylindrical skirt region; 125g groove; 125h opening; 130 rotor; 150 rotation shaft; 160 bearing; 200 casing; 200a entry side; 200b bottom surface side; 300 reduction gear; 350 resolver; 370 resolver stator; 371 resolver stator core; 372 resolver stator coil; 400 differential gear; 500 drive shaft receiving unit; 600 terminal block; 800 PCU (Power Control Unit); 800A power feed cable; 900 battery; 900A power feed cable; CL rotation central axis

The invention claimed is:

1. A rotating electric machine comprising a stator in an annular shape and a casing having a cylindrical portion and a bottom surface side, which fixes said stator,
said stator including:
a stator core, and
an external cylindrical ring fastened to an outer circumferential surface of said stator core,
said external cylindrical ring including:
a cylindrical body portion, and
a flange extending radially outward and provided at a first end portion of said body portion located at an entry side of said casing,
said body portion including:
a fastening region having a first inner diameter, said fastening region directly contacting the outer circumferential surface of said stator core and fastened to the outer circumferential surface of said stator core, and
a tapered skirt region located at a second end portion of the body portion near the bottom surface side of said casing, said tapered skirt region provided with a tip portion having a second inner diameter which is larger than the first inner diameter of said fastening region,
an outer surface of said skirt region contacting an inner surface of the cylindrical portion of said casing, and wherein at least a portion of the outer surface is inclined with respect to the inner surface of the cylindrical portion of said casing.

2. The rotating electric machine according to claim 1, wherein
said skirt region includes a region provided parallel to said fastening region.

3. The rotating electric machine according to claim 1, wherein
said skirt region includes a region not contacting said casing, with a weak area being provided in this region.

4. A rotating electric machine comprising a stator in an annular shape and a casing having a cylindrical portion and a bottom surface side, which fixes said stator,
said stator including:
a stator core comprising a plurality of annularly arranged divided cores, and
an external cylindrical ring fastened to an outer circumferential surface of said stator core so as to fasten the divided cores,
said external cylindrical ring including:
a cylindrical body portion, and
a flange extending radially outward and provided at a first end portion of said body portion located at an entry side of said casing,
said body portion including:
a fastening region having a first inner diameter, said fastening region directly contacting the outer circumferential surface of said stator core and fastened to the divided cores, and
a tapered skirt region located at a second end portion of the body portion near the bottom surface side of said casing, said tapered skirt region provided with a tip portion having a second inner diameter which is smaller than the first inner diameter, and
the inner surface of the cylindrical portion of said casing includes a projecting region contacting said tapered skirt region.

5. The rotating electric machine according to claim 4, wherein
said skirt region includes a region provided parallel to said fastening region.

6. The rotating electric machine according to claim 4, wherein
said skirt region has a tapered shape with a diameter gradually decreasing inward.

7. The rotating electric machine, according to claim 4, wherein said skirt region has an inner surface and an outer surface, and wherein at least a portion of both the inner surface and the outer surface is inclined with respect to the outer circumferential surface of said stator core.

* * * * *